(12) United States Patent
Jeon et al.

(10) Patent No.: US 7,499,142 B2
(45) Date of Patent: Mar. 3, 2009

(54) MANUFACTURING APPARATUS OF LIQUID CRYSTAL DISPLAY AND MANUFACTURING METHOD OF LIQUID CRYSTAL DISPLAY USING THE SAME

(75) Inventors: Baek-Kyun Jeon, Yongin-si (KR); Duck-Jong Suh, Seoul (KR); Bong-Sung Seo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 398 days.

(21) Appl. No.: 11/330,564

(22) Filed: Jan. 11, 2006

(65) Prior Publication Data

US 2006/0152667 A1 Jul. 13, 2006

(30) Foreign Application Priority Data

Jan. 13, 2005 (KR) .................. 10-2005-0003286

(51) Int. Cl.
*G02F 1/1339* (2006.01)
(52) U.S. Cl. .................. 349/155; 349/157; 349/187
(58) Field of Classification Search ............. 349/155, 349/157
See application file for complete search history.

(56) References Cited

U.S. PATENT DOCUMENTS

2003/0118922 A1 6/2003 Hayashi

2004/0095545 A1* 5/2004 Washizawa et al. ......... 349/155
2004/0125324 A1 7/2004 Kim

FOREIGN PATENT DOCUMENTS

| JP | 06011699 | 1/1994 |
|---|---|---|
| JP | 2000035582 | 2/2000 |
| JP | 2000056122 | 2/2000 |
| JP | 2001083529 | 3/2001 |
| JP | 2001091723 | 4/2001 |
| JP | 2001249342 | 9/2001 |
| JP | 2002333630 | 11/2002 |
| KR | 1019950014942 | 6/1995 |
| KR | 1019980017846 | 6/1998 |
| KR | 100220536 | 6/1999 |
| KR | 1019990043896 | 6/1999 |
| KR | 100289031 | 2/2001 |
| KR | 1020020086798 | 11/2002 |
| KR | 1020030015778 | 2/2003 |
| KR | 100388184 | 6/2003 |

\* cited by examiner

*Primary Examiner*—Richard H Kim
(74) *Attorney, Agent, or Firm*—Cantor Colburn LLP (57) ABSTRACT

A manufacturing apparatus of a liquid crystal display includes a spacer supply plate provided with a plurality of grooves into which spacers are injected, a transcribing roller into a surface of which the spacers are first-transcribed thereof, and a support plate mounting a panel into which the spacers on the surface of the transcribing roller are second-transcribed.

22 Claims, 8 Drawing Sheets

MANUFACTURING APPARATUS OF LIQUID CRYSTAL DISPLAY AND MANUFACTURING METHOD OF LIQUID CRYSTAL DISPLAY USING THE SAME

This application claims priority to Korean Patent application No. 2005-0003286 filed on Jan. 13, 2005 and all the benefits accruing therefrom under 35 U.S.C. §119, the contents of which are herein incorporated by reference in its entirety.

BACKGROUND OF THE INVENTION (a) Field of the Invention

The present invention relates to a manufacturing apparatus of a liquid crystal display, and a manufacturing method of a liquid crystal display using the same.

(b) Description of Related Art

A liquid crystal display (LCD) includes upper and lower panels provided with field-generating electrodes and a liquid crystal (LC) layer interposed therebetween. The upper and the lower panels are combined with a sealant printed along the periphery thereof, enclosing the LC layer, and spaced apart with a gap and supported by a plurality of spacers.

The LCD applies voltages to the field-generating electrodes to generate an electric field in the LC layer that has dielectric anisotropy, and controls the magnitude of the voltages applied to the electrodes to control the strength of the electric field, thereby controlling the transmittance of light passing through the LC layer to display images.

The spacers are spacer beads with a spherical shape and formed in an irregular pattern, or column spacers or rigid spacers formed in a regular pattern.

The column spacers are formed corresponding to portions where the light does not pass through. For example, portions may include a channel of the thin film transistor (TFT), a gate line, and a storage electrode line.

However, the spacer beads that are distributed irregularly function as alien material and cause light leakage, thereby reducing a contrast ratio. A portion of spacer beads moving even slightly damages an alignment layer. Moreover, the column spacers increase process steps during manufacturing which increases manufacturing cost and have such small elasticity so that the extent and accuracy to which the spacers can be shaped, formed or spread during drop filling is reduced, thereby causing imperfect filling or smear faults.

SUMMARY OF THE INVENTION

A manufacturing apparatus of a liquid crystal display is provided, the apparatus including a spacer supply plate provided with a plurality of grooves in which spacers are injected, a transcribing roller onto a surface of which the spacers are first-transcribed, and a support plate mounting a panel onto which the spacers on the surface of the transcribing roller are second-transcribed.

A manufacturing method of a liquid crystal display is provided, the method including injecting spacers in a plurality of grooves formed in a spacer supply plate, first-transcribing the spacers in the grooves onto a surface of a transcribing roller, and second-transcribing the spacers on the surface of the transcribing roller onto a first panel. Each of the spacers includes a plurality of sub-spacers having different sizes.

A manufacturing method of a liquid crystal display is also provided including injecting spacers in a plurality of grooves formed in a spacer supply plate, first-transcribing the spacers in the grooves onto a surface of a transcribing roller, and second-transcribing the spacers on the surface of the transcribing roller onto a first panel. Each of the spacers includes a plurality of sub-spacers having different elasticities. A liquid crystal display includes a first substrate, a second substrate disposed opposite to the first substrate, a liquid crystal layer interposed between the first substrate and the second substrate, and spacers arranged between the first substrate and the second substrate. The spacers maintain a gap between the first substrate and the second substrate. Each of the spacers includes a plurality of sub-spacers having different sizes.

A liquid crystal display is also provided including a first substrate, a second substrate disposed opposite to the first substrate, a liquid crystal layer interposed between the first substrate and the second substrate, and spacers arranged between the first substrate and the second substrate. The spacers maintain a gap between the first substrate and the second substrate. Each of the spacers includes a plurality of sub-spacers having different elasticities.

BRIEF DESCRIPTION OF THE DRAWINGS

The present invention will become more apparent by describing exemplary embodiments thereof in detail with reference to the accompanying drawings, in which.

DETAILED DESCRIPTION OF THE INVENTION

The present invention will be described more fully hereinafter with reference to the accompanying drawings, in which preferred embodiments of the inventions invention are shown. This invention may, however, be embodied in many different forms and should not be construed as limited to the embodiments set forth herein.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numerals refer to like elements throughout.

It will be understood that when an element such as a layer, film, region, substrate, or panel is referred to as being "on", "connected to" or "coupled to" another element or layer, it can be directly on the other element or intervening elements may also be present. In contrast, when an element is referred to as being "directly on", "directly connected to" or "directly coupled to" another element, there are no intervening elements present. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
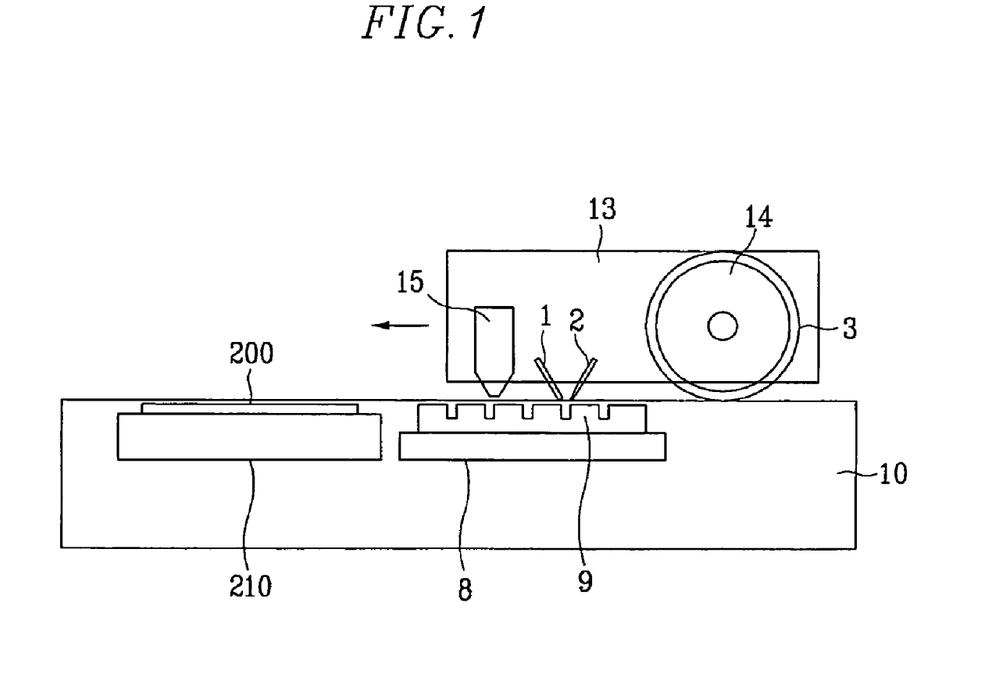
FIG. 1 is a schematic view of an exemplary embodiment of a manufacturing apparatus of an LCD according to the present invention.
Figure 2:
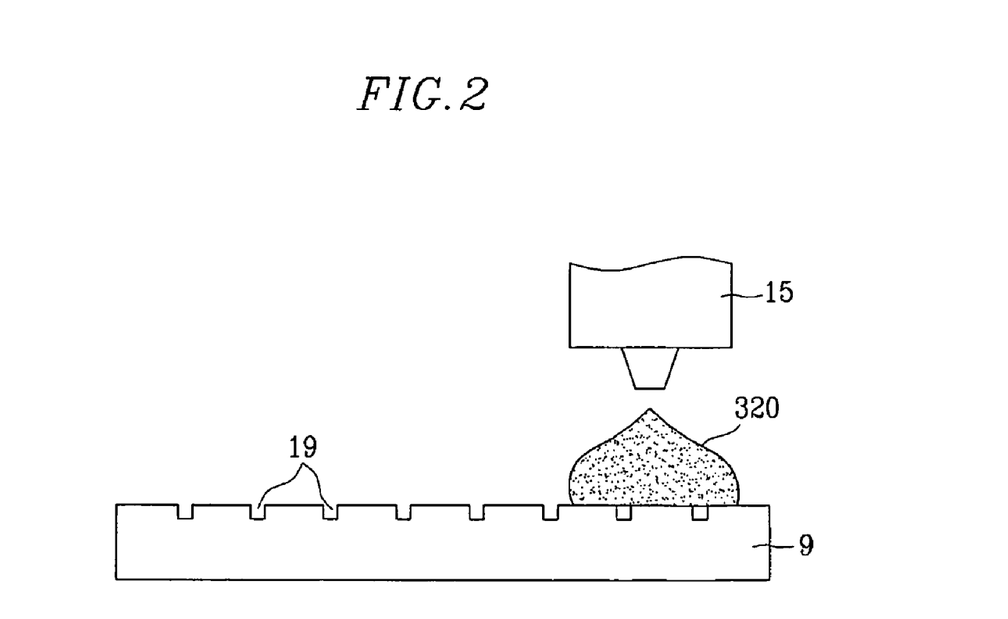
FIG. 2 shows an exemplary embodiment of a step of dropping spacers on a spacer supply plate.
Figure 3A:
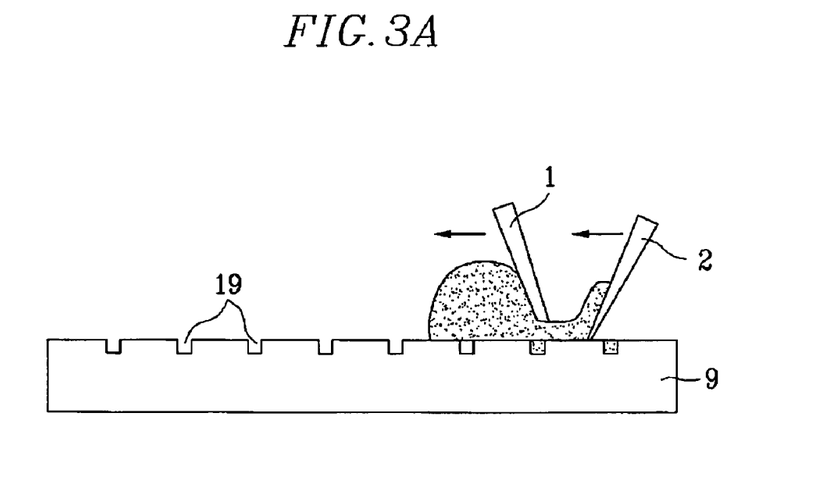
FIG. 3A shows an exemplary embodiment of a step of uniformly injecting the spacers dropped on the plate in a plurality of grooves.
Figure 3B:
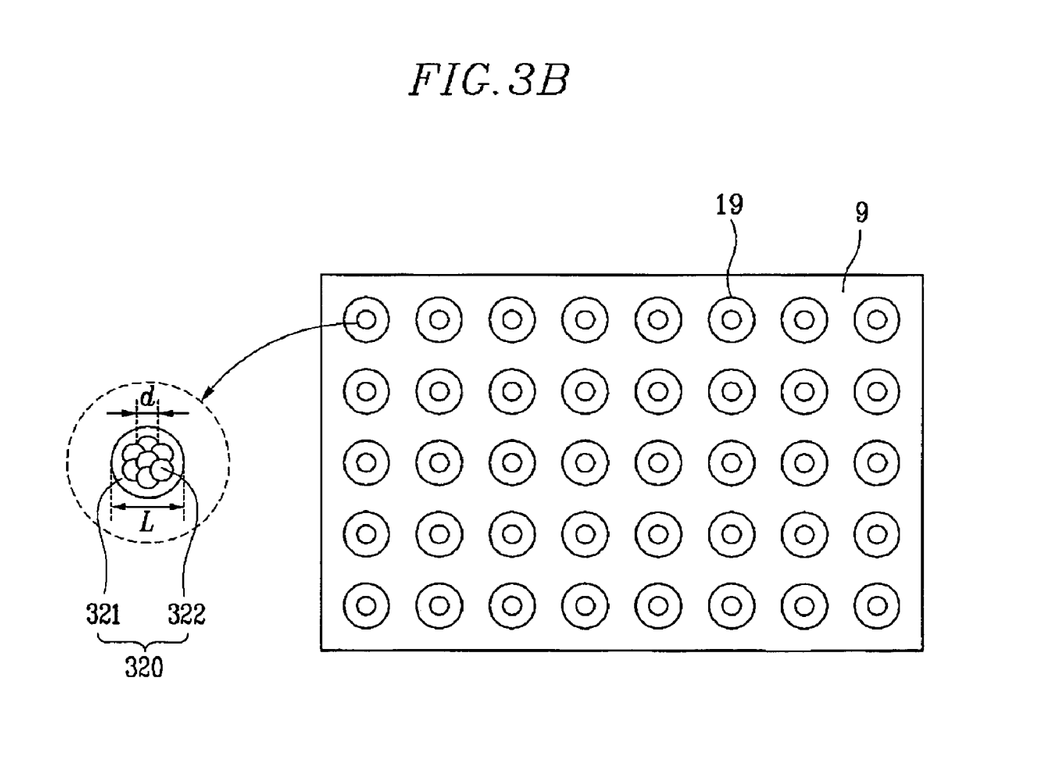
FIG. 3B shows an exemplary embodiment of a state of the spacers being injected on the grooves of the plate.
Figure 4:
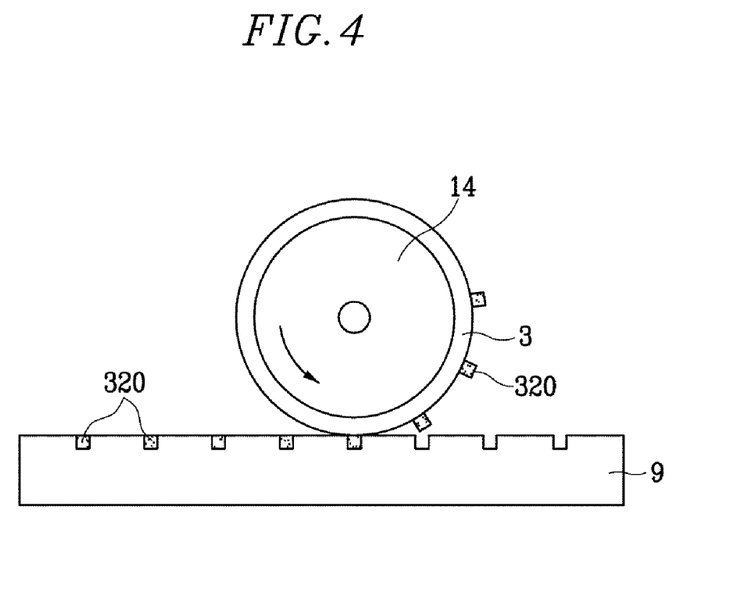
FIG. 4 shows an exemplary embodiment of a process of the spacers in the substrate being transcribed into a surface of a transcribing roller.
Figure 5:
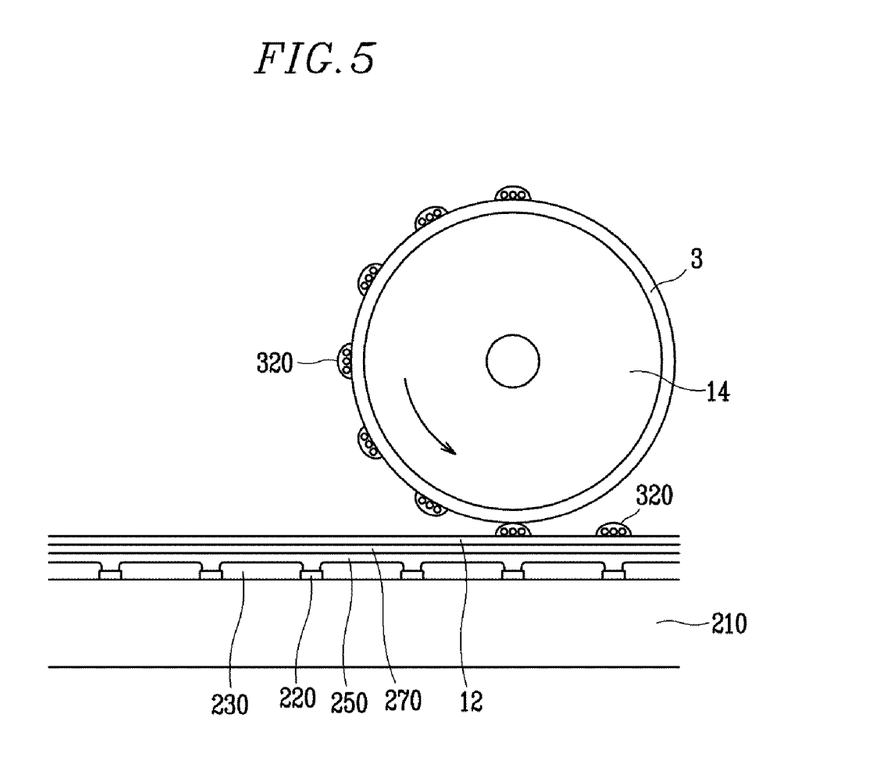
FIG. 5 shows an exemplary embodiment of a step of transcribing the spacers attached on the surface of the transcribing roller into a panel.
Figure 6:
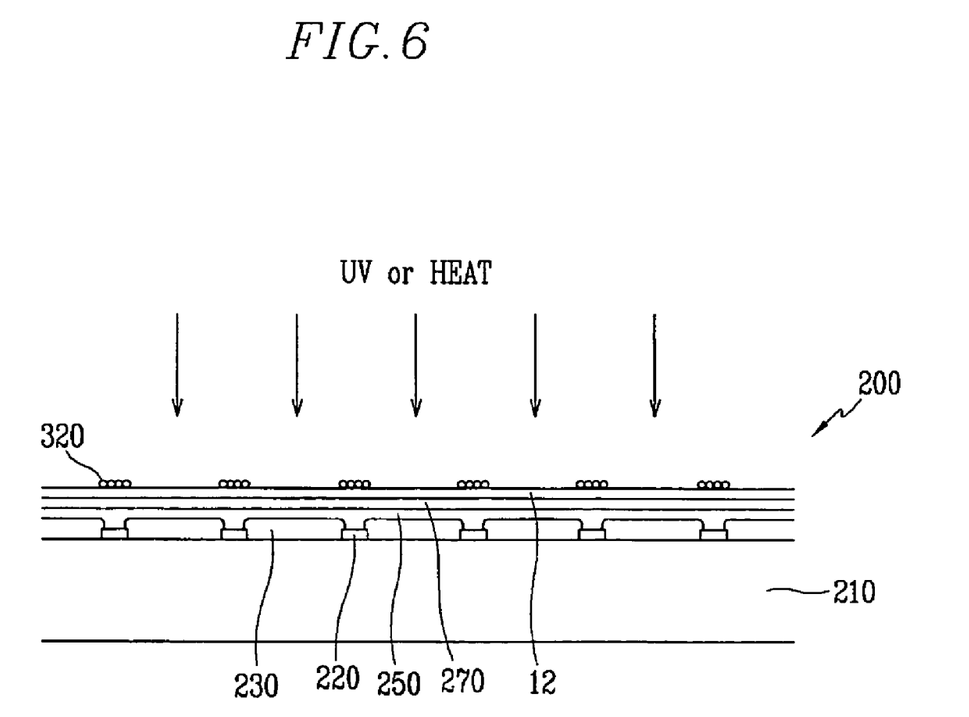
FIG. 6 shows an exemplary embodiment of a step of hardening the spacers on the panel.
Figure 7A:
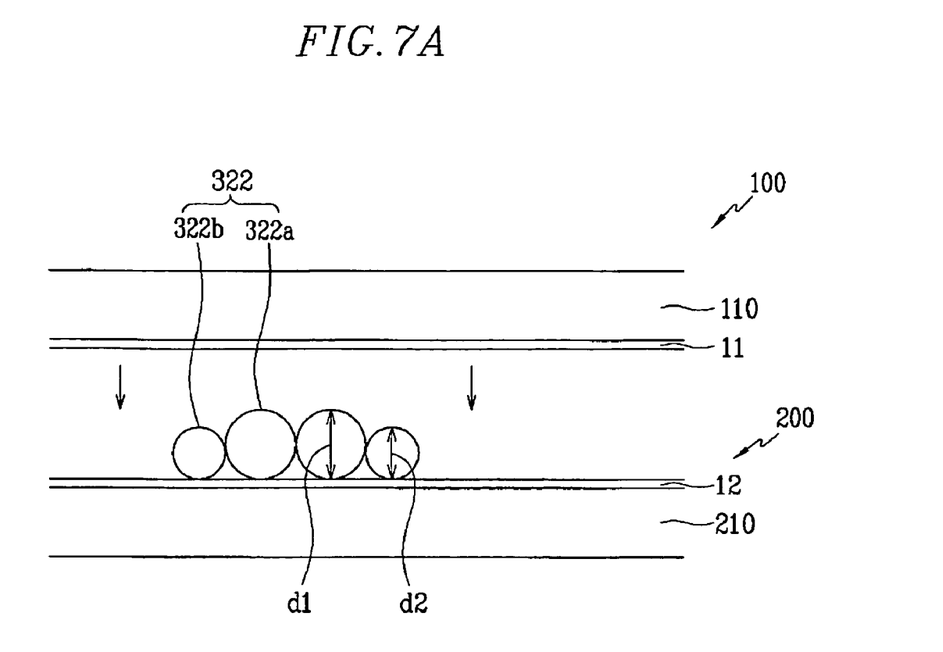
FIGS. 7A and 7B show exemplary embodiments of steps of pressing spacers interposed between two panels.
Figure 7B:
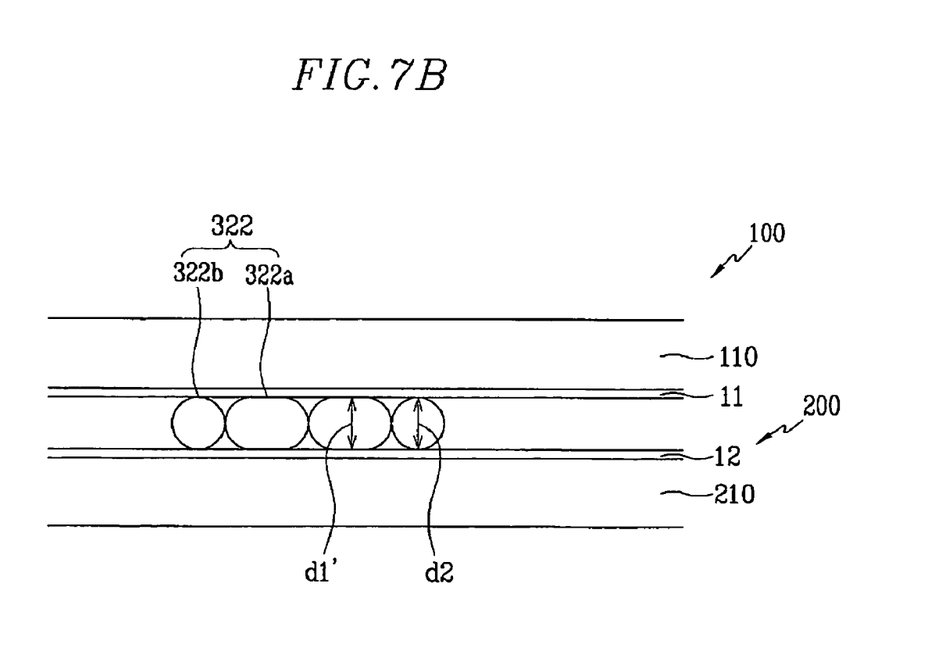

FIG. 1 is an exemplary embodiment of a schematic view of a manufacturing apparatus of an LCD according to the present invention, FIG. 2 shows an exemplary embodiment of a step of dropping spacers on a space supply substrate, FIG. 3A shows an exemplary embodiment of a step of uniformly injecting the spacers dropped on the substrate in a plurality of grooves, FIG. 3B shows an exemplary embodiment of a state of the spacers being injected on the grooves of the substrate, FIG. 4 shows an exemplary embodiment of a process of the spacers in the substrate being transcribed into a surface of a transcribing roller, FIG. 5 shows an exemplary embodiment of a step of transcribing the spacers attached on the surface of the transcribing roller into a panel, FIG. 6 shows an exemplary embodiment of a step of hardening the spacers on the panel, and FIGS. 7A and 7B show exemplary embodiments of steps of pressing spacers interposed between two panels.

Referring to FIG. 1, an exemplary embodiment of a manufacturing apparatus of an LCD according to the present invention includes a spacer supply plate 9, a transcribing roller 14, a spacer supply device 15, and a support plate 210 mounting a panel 200.

The spacer supply plate 9 and the support plate 210 are provided on a lower frame 10, and the transcribing roller 14 and the spacer supply device 15 are provided on an upper frame 13. Particularly, the spacer supply plate 9 is disposed on a printing plate 8 and is provided with a plurality of grooves 19. The spacer 320 is deposited on the spacer supply plate 9 at a predetermined interval. The depositing of the spacer 320 may include a form of injecting. The spacer supply plate 9 may include, but is not limited to, glass, plastic, or metal [e.g., steel use stainless (SUS)]. The grooves 19 may be formed by a die method or a laser processing method. Referring to FIG. 3B, a size of the grooves 19 is larger than a size L of the spacer 320. The spacer 320 may be comprised of a plurality of sub-spacers 322, each of which has a size d. In exemplary embodiments, the number of the sub-spacers 322 may be about ten. The grooves 19 are formed in the same interval and frequency as the spacer 320 formed on the panel 200. The panel 200 provided with the spacer 320 is ultimately mounted on the support plate 210.

The spacer supply device 15 may drop a plurality of the spacer 320 comprised of many kinds of sub-spacers 322 onto the spacer supply plate 9. The spacers 320 may have different sizes or various types of sub-spacers 322. For example, in exemplary embodiments, the sub-spacers 322 may have different elasticity to improve the capability and accuracy of shaping, forming or spreading the spacer 320 during the process of drop filling, thereby reducing or effectively eliminating an abnormal cell gap.

A surface of the transcribing roller 14 may be attached with a transcribing sheet 3 having good hydrophilicity. Doctor blades 1 and 2, which uniformly inject or insert the spacers 320 dropped from the spacer supply device 15 to the spacer supply plate 9 in the grooves 19, may also be disposed at the back side of the spacer supply device 15.

An exemplary embodiment of a manufacturing method of an LCD using the manufacturing apparatus of an LCD according to an exemplary embodiment of the present invention will now be described in detail.

At first, a spacer solvent 320 is dropped on the spacer supply plate 9 using the spacer supply device 15 as shown in FIG. 2. In exemplary embodiments, the spacer solvent 320 may be dropped with a thermal curing agent or a light (UV) curing agent together.

Referring to FIG. 3A, the spacer 320 is inserted in the grooves 19 with the thermal curing agent or the UV curing agent 321 using the doctor blades 1 and 2. As shown in FIG. 3B, the spacer 320 may include a plurality of sub-spacers 322 and the curing agent 321. As described above, the size L of the spacer 320 including the size d of the sub-spacers 322 is smaller than that of the groove 19. In exemplary embodiments, the size L of the spacer 320 is substantially uniform. In other exemplary embodiments, the sub-spacers 322 may have different sizes, ranging for example, from about 1 μm to about 3 μm.

The sub-spacers 322 may be made of an organic material having a low dielectric such as an acrylic compound, including but not limited to, Teflon, benzocyclobutene (BCB), cytop, and perflurocyclobutene (PFCB).

Additionally, the spacer 320 may be made of a variety of sub-spacers 322 having different elasticity.

As shown in FIG. 4, the spacers 320 are transcribed into the transcribing sheet 3 of the transcribing roller 14 at the same interval as the grooves 19 by rotation of the transcribing roller 14.

As shown in FIG. 5, the transcribing roller 14 having the spacers 320 attached to the surface thereof on the transcribing sheet moves relative to the spacer supply plate 9 to be positioned above the support plate 210. With the transcribing roller 14 above the support plate 210, the spacers 320 are transcribed from into the panel 200 thereon at a substantially uniform interval.

FIG. 5 shows a state of transcribing the spacers 320 into the panel 200 on which light blocking members 220, color filters 230, an overcoat layer 250, a common electrode 270, and an alignment layer 12 are formed. In exemplary embodiments, the spacers 320 may be disposed before forming the alignment layer 12. As illustrated in FIG. 5, the spacers 320 are disposed at portions corresponding to the light blocking members 220, thereby preventing light from leaking.

As shown in FIG. 6, the spacers 320 including the curing agent 321 are exposed to heat or UV to cure the spacers 320 causing the spacers 320 to be firmly attached to the panel 200.

Next, as shown in FIGS. 7A and 7B, the upper panel 200 and the lower panel 100 are pressed together.

As discussed above, the spacers 320 may be comprised of the sub-spacers 322 having different sizes. For example, a sub-spacer 322a illustrated in FIGS. 7A and 7B includes a larger (uncompressed) dimension d1 than the sub-spacer 322b including a smaller (uncompressed) dimension d2. Dimensions d1 and d2 are defined by a distance between edges of the sub-spacers 322a and 322b along a direction substantially perpendicular to the upper panel 200.

As shown in FIG. 7B, the sub-spacers 322a and 322b are compressed in a direction substantially perpendicular to the lower panel 100 such that the larger dimension d1 of the sub-spacer 322a becomes substantially the same to the dimension d2 of the sub-spacer 322b. The dimensions d1' and d2 of the sub-spacers 322a and 322b, respectively, after applying a compressive force are effectively equal. A cell gap between the upper panel 200 and the lower panel 100 is essentially determined by the smaller dimension d2 of the sub-spacer 322b.

Advantageously, the larger sub-spacers 322a with a dimension d1 and the smaller sub-spacers 322b with a dimension d2, where d1 is greater than d2, allows modification (eg. shaping, forming, spreading) of the spacers 320 to be facilitated, thereby improving manufacturing consistency and accuracy of the LCD. Additionally, the smaller sub-spacers 322b with dimension d2 essentially maintains a minimal cell gap.

Where the spacers 320 are comprised of the sub-spacers 322 having a variety of different elasticities, a sub-spacer 322 having a higher elasticity is pressed to be of a substantially similar dimension or size a sub-spacer 322 having a lower elasticity. A cell gap between the upper panel 200 and the lower panel 100 is effectively determined by the sub-spacer 322 having the lower elasticity.

The spacers 320 including the sub-spacers 322a and 322b having a variety of sizes and elasticities are disposed at predetermined positions using the transcribing roller 14. Advantageously, a cell gap is kept substantially uniform as well as increasing the elasticity of the panels 200 and 100. Additionally, a smear fault that may be generated at the time of pressing the panels 100 and 200 is reduced or effectively prevented.

Furthermore, the exemplary embodiments described above have both an advantage of being spacer beads that have high elasticity allowing a simpler manufacturing process and an advantage of being column spacers that are disposed at predetermined positions to prevent light leakage allowing a simpler management and implementation of the manufacturing process, improving yield consistency.

Figure 8:
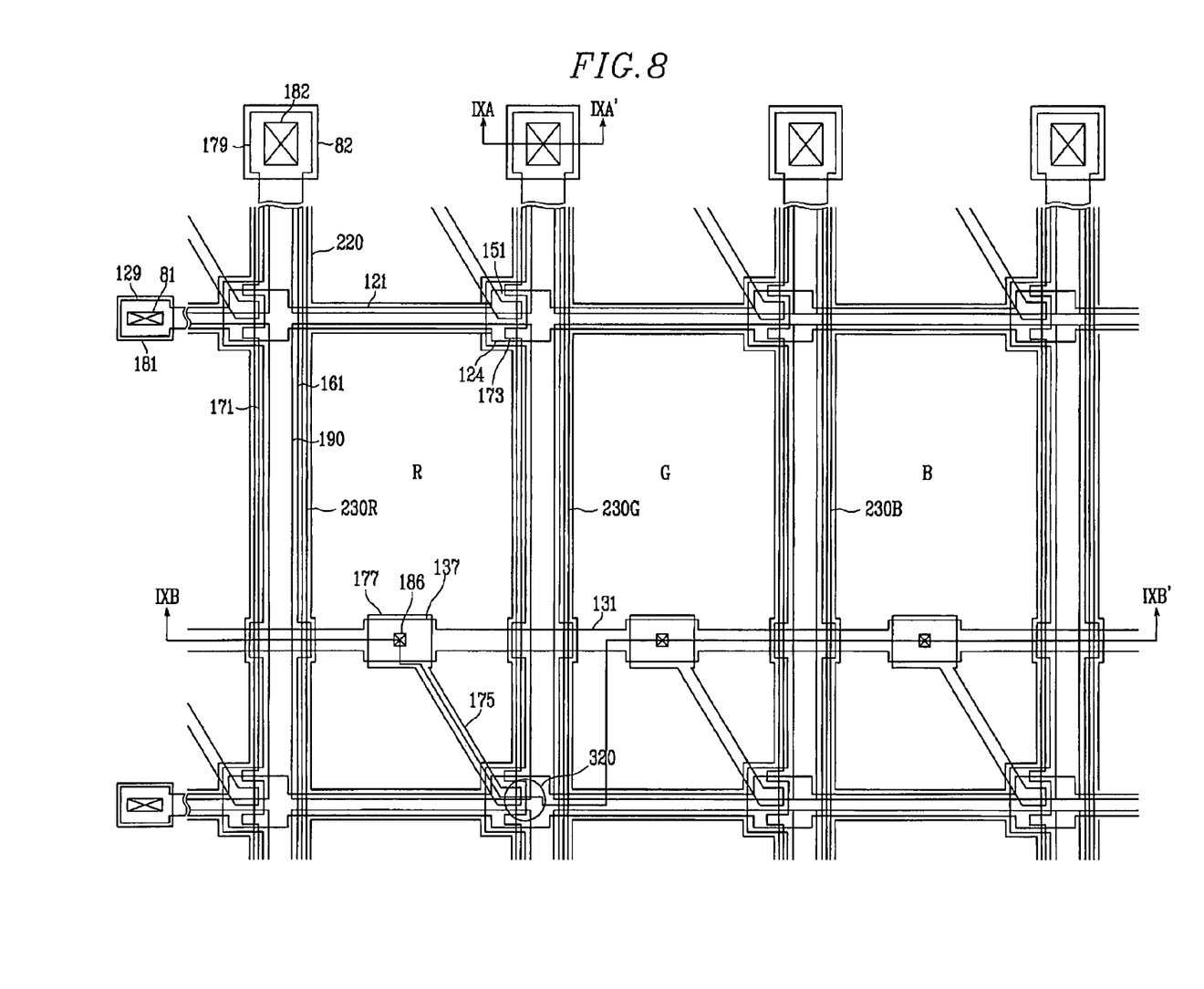
FIG. 8 is an exemplary embodiment of a layout view of a thin film transistor provided with spacers according to the present invention.
Figure 9A:
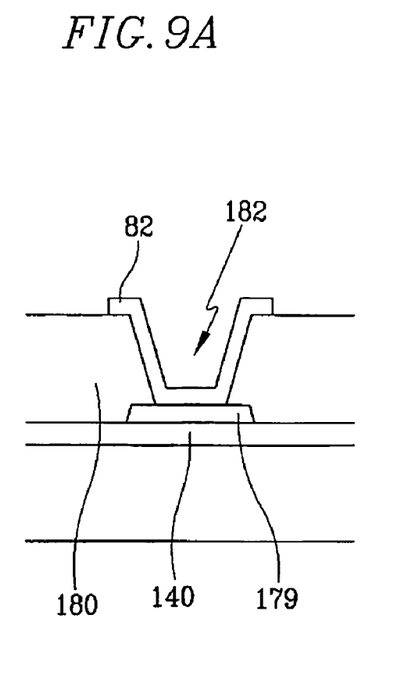
FIGS. 9A and 9B are exemplary embodiments of sectional views of the thin film transistor shown in FIG. 8 taken along lines IXA-IXA' and IXB-IXB', respectively.
Figure 9B:
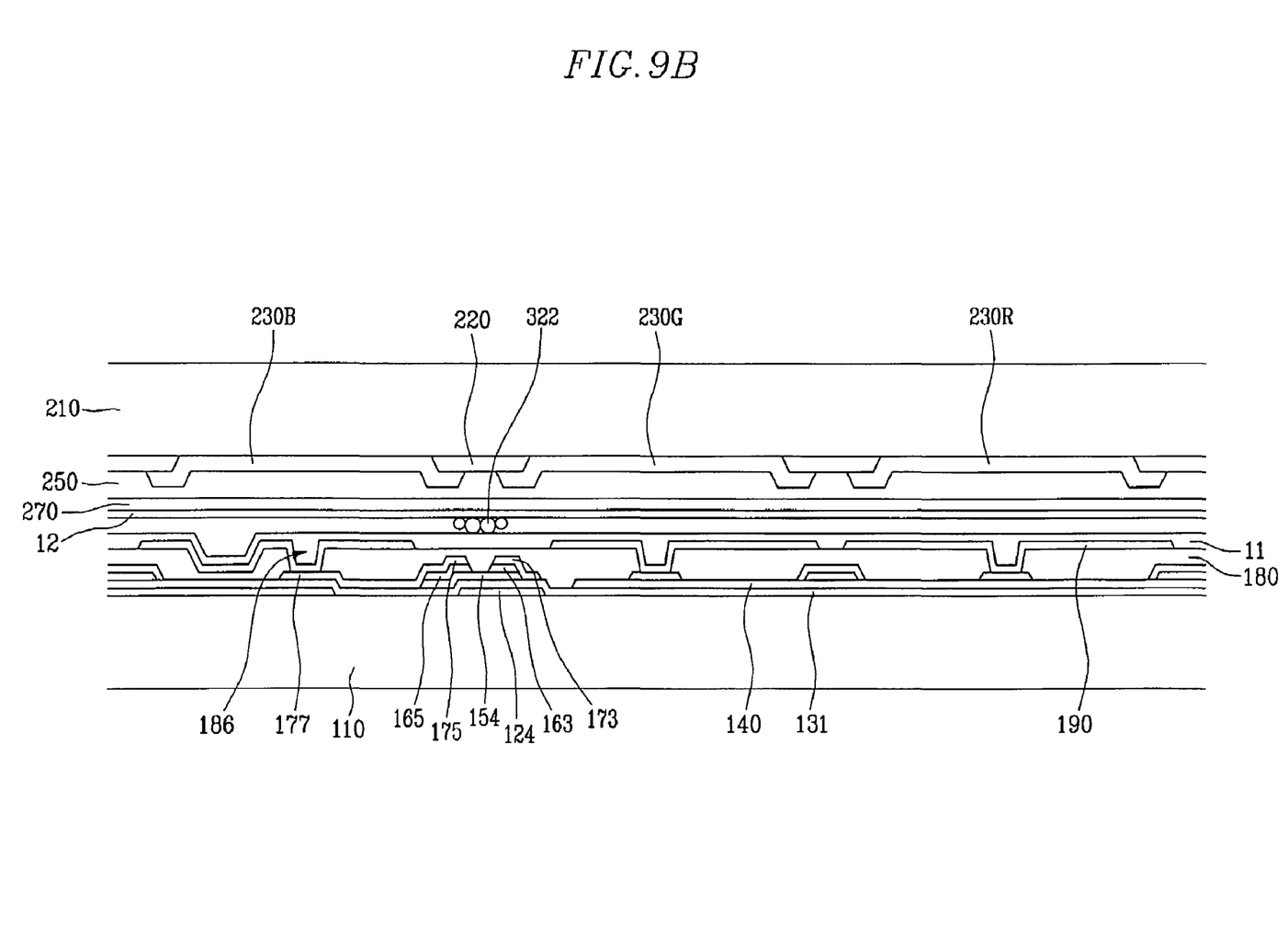

FIG. 8 is an exemplary embodiment of a layout view of a thin film transistor provided with spacers according to present invention, and FIGS. 9A and 9B are exemplary embodiments of sectional views of the thin film transistor shown in FIG. 8 taken along lines IXA-IXA' and IXB-IXB', respectively.

The lower panel 100 is now described in detail with reference to FIGS. 8-9B.

A plurality of gate lines 121 and a plurality of storage electrode lines 131 are formed on an insulating substrate 110.

The gate lines 121 and the storage electrode lines 131 extend substantially in a transverse direction and are separated from each other. Each gate line 121 transmits a gate signal and includes a plurality of projections forming a plurality of gate electrodes 124. Each storage electrode line 131 is supplied with a predetermined voltage such as a common voltage and includes a plurality of projections forming storage electrodes 137.

In exemplary embodiments, the gate lines 121 and the storage electrode lines 131 may have a multi-layered structure including two films having different physical characteristics, i.e., a lower film and an upper film. The upper film may be made of a low resistivity metal including, but not limited to, an Al-containing metal such as Al and an Al alloy, an Ag-containing metal such as Ag and an Ag alloy, or a Cu-containing metal such as Cu and a Cu alloy for reducing signal delay or voltage drop in the gate lines 121 and the storage electrode lines 131. The lower film may be made of material including, but not limited to, Cr, Mo, Mo alloy, Ta, or Ti, which have good physical, chemical, and electrical contact characteristics with other materials such as indium tin oxide (ITO) or indium zinc oxide (IZO). Exemplary embodiments may include a combination of the lower film material and the upper film material is Cr and an Al—Nd alloy.

The lateral sides of the gate lines 121 and the storage electrode lines 131 may be inclined relative to a surface of the substrate 110. In exemplary embodiments, the inclination angle may range from about 30 to 80 degrees.

Referring to FIG. 9A, a gate insulating layer 140 is formed on the gate lines 121 and the storage electrode lines 131. The gate insulating layer 140 may be made of silicon nitride (SiNx).

A plurality of semiconductor stripes 151 are formed on the gate insulating layer 140. The semiconductor stripes 151 may be made of hydrogenated amorphous silicon (abbreviated as "a-Si") or polysilicon. Each semiconductor stripe 151 extends substantially in the longitudinal direction and has a plurality of projections 154 branched out toward the gate electrodes 124.

A plurality of ohmic contact stripes and islands 161 and 165 are formed on the semiconductor stripes 151. The ohmic contact stripes and islands 161 and 165 may be made of silicide or n+ hydrogenated a-Si heavily doped with an n-type impurity. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110. In exemplary embodiments, inclination angles inmate be in a range between about 30 and 80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer (not shown) or an external device (not shown), and source electrodes 173 projecting toward the drain electrodes 175. Each pair of source and drain electrodes 173 and 175 are disposed opposite each other with respect to the gate electrode 124. The gate electrode 124, a source electrode 173, and a drain electrode 175 along with a semiconductor exposure 154 form a TFT having a channel formed in the semiconductor exposure 154 disposed between the source electrode 173 and the drain electrode 175.

In exemplary embodiments, the data lines 171 and the drain electrodes 175 may also include conductive layers including, but not limited to, materials made of an Al-containing metal or an Ag-containing metal. In alternative exemplary embodiments, the data lines 171 and the drain electrodes 175 may have a multilayered structure including a low-resistivity film (not shown) and a good-contact film (not shown). Examples of the multi-layered structure include a double-layered structure having a lower Cr film and an upper Al (alloy) film, a double-layered structure having a lower Mo (alloy) film and an upper Al (alloy) film, and a triple-layered structure having a lower Mo film, an intermediate Al film, and an upper Mo film. The drain electrodes 175 may also have inclined lateral sides, and the inclination angles thereof range from about 30 to 80 degrees.

A passivation layer 180 is formed on the data lines 171 and the drain electrodes 175 and exposed portions of the semiconductor stripes 151, which are not covered with the data lines 171 and the drain electrodes 175.

The passivation layer 180 has a plurality of contact holes 181, 182, and 186 exposing the end portions 129 and 179 of the gate line 121, the data lines 171, and the drain electrodes 175, respectively.

A plurality of pixel electrodes 190 and a plurality of contact assistants 81 and 82, which may be made of a transparent conductive material such as ITO or IZO, are formed on the passivation layer 180.

The pixel electrodes 190 are physically and electrically connected to the drain electrodes 175 through the contact holes 186 such that the pixel electrodes 190 receive the data voltages from the drain electrodes 175. The pixel electrodes 190 supplied with the data voltages generate electric fields in cooperation with the common electrode 270, which reorient liquid crystal molecules disposed therebetween.

A pixel electrode 190 and the common electrode 270 form a capacitor called a "liquid crystal capacitor," which stores applied voltages after turn-off of the TFT. In exemplary embodiments, an additional capacitor called a "storage capacitor," which is connected in parallel to the liquid crystal capacitor, may be provided for enhancing the voltage storing capacity. The storage capacitors are implemented by overlapping the pixel electrodes 190 with the storage electrode lines 131. The capacitances of the storage capacitors, i.e., the storage capacitances, are increased by providing the projections (i.e., the storage electrodes) 137 at the storage electrode lines 131, elongating the drain electrodes 175 connected to the pixel electrodes 190, and providing the expansions 177 at the drain electrodes 175 overlapping the storage electrodes 137 of the storage electrode lines 131 for decreasing the distance between the terminals and increasing the overlapping areas.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesion between the exposed portions 129 and 179 and external devices. In exemplary embodiments, the contact assistants 81 and 82 may be connected to external devices through anisotropic conductive films (ACF) (not shown), for example.

The contact assistants 81 may play a role in connecting the gate lines 121 and metal layers of a gate driving circuit (not shown), if it is integrated on the TFT array panel. Similarly, the contact assistants 82 may play a role in connecting the data lines 171 and metal layers of a data driving circuit, if it is integrated on the TFT array panel.

Referring to FIG. 9B, a lower alignment layer 11 is formed on the pixel electrodes 190.

The description of the upper panel 200 follows with reference to FIGS. 8-9B.

A light blocking member called a black matrix 220 is formed on an insulating substrate 210 such as transparent glass.

A plurality of color filters 230R, 230G, and 230B, each of which may represent one of three major colors such as red, green, and blue colors, are formed on the substrate 210 and the light blocking member 220 and they are disposed substantially in the open areas defined by the light blocking members 220. The color filters 230R, 230G, and 230B disposed in two adjacent data lines 171 and arranged in the longitudinal direction may be connected to each other to form a stripe.

An overcoat 250 is formed on the color filters 230R, 230G, and 230B, and the light blocking member 220. The overcoat 250 may be made of an organic material. The overcoat 250 protects the color filters 230R, 230G, and 230B and has a substantially flat top surface.

A common electrode 270 is formed on the overcoat 250. The common electrode 270 may be made of a transparent conductive material such as ITO and IZO An upper alignment layer 12 is formed on the common electrode 270, and a plurality of sub-spacers 322 are disposed on the upper alignment layer 12. The smaller sub-spacers 322b play a role in maintaining a cell gap, and the larger sub-spacers 322a play a role in distributing an external pressure, as discussed above.

According to exemplary embodiments of the present invention, the spacers 320, including the sub-spacers 322a and 322b having a variety of sizes and elasticities, are disposed at predetermined positions using the transcribing roller 14. Advantageously, a cell gap may be maintained substantially uniform as well as the elasticity of the panel is effectively improved. Additionally, a smear fault that is easy to generate at the time of pressing the panels 110 and 210 is reduced or effectively prevented.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing apparatus of a liquid crystal display, comprising:
   a spacer supply plate provided with a plurality of grooves in which spacers are injected;
   a transcribing roller, wherein the spacers are first-transcribed onto a surface thereof; and
   a support plate mounting a panel onto which the spacers on the surface of the transcribing roller are second-transcribed,
   wherein each of the spacers comprises a plurality of sub-spacers having different sizes, the spacers are disposed separated from each other at a distance and the sub-spacers in each of the spacers substantially contact each other.

2. The manufacturing apparatus of claim 1, wherein the grooves are disposed at a predetermined interval.

3. The manufacturing apparatus of claim 2, wherein the spacers on the surface of the transcribing roller are disposed at an interval corresponding to an interval of the grooves.

4. The manufacturing apparatus of claim 1, wherein the spacers are injected into the grooves along with a thermal curing agent, an ultra violet ray (UV) curing agent or both.

5. The manufacturing apparatus of claim 1, wherein the difference of the sizes of the sub-spacers ranges from about 1 µm to about 3 µm.

6. The manufacturing apparatus of claim 1, wherein the spacers comprise of a plurality of sub-spacers having different elasticities.

7. A manufacturing method of a liquid crystal display, comprising:
   injecting spacers into a plurality of grooves formed in a spacer supply plate;
   first-transcribing the spacers in the grooves onto a surface of a transcribing roller; and
   second-transcribing the spacers on the surface of the transcribing roller onto a first panel,
   wherein each of the spacers comprises a plurality of sub-spacers having different sizes, the spacers being disposed separated from each other at a distance and the sub-spacers in each of the spacers substantially contact each other.

8. The manufacturing method of claim 7, wherein the spacers second-transcribed onto the first panel comprise a thermal curing agent, a UV curing agent or both.

9. The manufacturing method of claim 8, further comprising attaching the spacers to the first panel by heat, by UV or both.

10. The manufacturing method of claim 7, further comprising attaching the first panel to a second panel.

11. The manufacturing method of claim 7, further comprising attaching the first panel to a second panel, the spacers being disposed between the first panel and the second panel, wherein a sub-spacer having a larger size is compressed to have a size substantially equal to a sub-spacer having a smaller size.

12. The manufacturing method of claim 11, wherein a cell gap between the first and second panels is determined by the sub-spacer having the smaller size.

13. The manufacturing method of claim 7, wherein the grooves are disposed at a predetermined interval.

14. The manufacturing method of claim 7, wherein the spacers on the surface of the transcribing roller are disposed at an interval corresponding to an interval of the grooves.

15. A manufacturing method of a liquid crystal display, comprising:
   injecting spacers into a plurality of grooves formed in a spacer supply plate;
   first-transcribing the spacers in the grooves onto a surface of a transcribing roller; and
   second-transcribing the spacers on the surface of the transcribing roller onto a first panel,
   wherein each of the spacers comprises a plurality of sub-spacers having different elasticities, the spacers being disposed separated from each other at a distance and the sub-spacers in each of the spacers substantially contact each other.

16. The manufacturing method of claim 15, further comprising attaching the first panel to a second panel, the spacers being disposed between the first panel and the second panel, wherein a sub-spacer having a higher elasticity is pressed to have a size substantially equal to a sub-spacer having a lower elasticity.

17. The manufacturing method of claim 16, wherein a cell gap between the first and second panels is determined by the sub-spacer having the lower elasticity.

18. The manufacturing method of claim 15, wherein the grooves are disposed at a predetermined interval.

19. The manufacturing method of claim 15, wherein the spacers on the surface of the transcribing roller are disposed at an interval corresponding to an interval of the grooves.

20. The manufacturing method of claim 15, wherein the spacers second-transcribed onto the first panel comprise a thermal curing agent, a UV curing agent or both.

21. The manufacturing method of claim 20, further comprising attaching the spacers to the first panel by heat, by UV or both.

22. The manufacturing method of claim 15, further comprising attaching the first panel to a second panel by pressure.

* * * * *